US012697704B2

(12) United States Patent
White et al.

(10) Patent No.: US 12,697,704 B2
(45) Date of Patent: Aug. 4, 2026

(54) ANCHORING TOOL

(71) Applicant: Robert Bosch GmbH, Stuttgart (DE)

(72) Inventors: Daniel White, Bettendorf, IA (US);
Eric Siegel, Arlington Heights, IL (US);
Jeremy Rubens, Palatine, IL (US);
Walter Bernardi, Highland Park, IL (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 19/195,978

(22) Filed: May 1, 2025

(65) Prior Publication Data

US 2025/0345907 A1     Nov. 13, 2025

Related U.S. Application Data

(60) Provisional application No. 63/644,137, filed on May 8, 2024, provisional application No. 63/644,134, filed on May 8, 2024.

(51) Int. Cl.
| | |
|---|---|
| *F16B 15/04* | (2006.01) |
| *B25C 1/00* | (2006.01) |
| *F16B 15/08* | (2006.01) |
| *B25C 1/04* | (2006.01) |
| *B25C 1/06* | (2006.01) |
| *B25C 1/08* | (2006.01) |
| *F16B 15/00* | (2006.01) |

(52) U.S. Cl.
CPC .............. *B25C 1/005* (2013.01); *B25C 1/008* (2013.01); *F16B 15/04* (2013.01); *F16B 15/08*

(2013.01); *B25C 1/047* (2013.01); *B25C 1/06* (2013.01); *B25C 1/08* (2013.01); *F16B 15/0015* (2013.01)

(58) Field of Classification Search
CPC ......... B25C 1/005; B25C 1/008; F16B 15/04; F16B 15/08; B23P 11/00
See application file for complete search history.

(56) References Cited

U.S. PATENT DOCUMENTS

| | | | | |
|---|---|---|---|---|
| 2,153,874 A | * | 4/1939 | Posnack ................ | B25C 5/0271 |
| | | | | 29/432.1 |
| 2,641,154 A | | 6/1953 | Heller | |
| 2,693,335 A | | 11/1954 | Kennedy et al. | |
| 3,813,985 A | | 6/1974 | Perkins | |
| 3,945,414 A | | 3/1976 | Gordon | |
| 8,348,580 B2 | | 1/2013 | Holveck | |
| 9,481,078 B2 | | 11/2016 | Maltais et al. | |
| 9,657,761 B2 | | 5/2017 | Yang et al. | |
| 10,773,367 B2 | * | 9/2020 | Huang .................... | B25C 1/188 |

* cited by examiner

*Primary Examiner* — Nathaniel C Chukwurah
(74) *Attorney, Agent, or Firm* — Maginot, Moore & Beck LLP

(57) ABSTRACT

An anchoring tool includes a driving member defining a striking axis and a driving actuator configured to actuate the driving member along the striking axis to drive a first fastener into a workpiece. The anchoring tool further includes a bending mechanism having a first deforming member configured to deform the first fastener at least partially out of the striking axis.

13 Claims, 6 Drawing Sheets

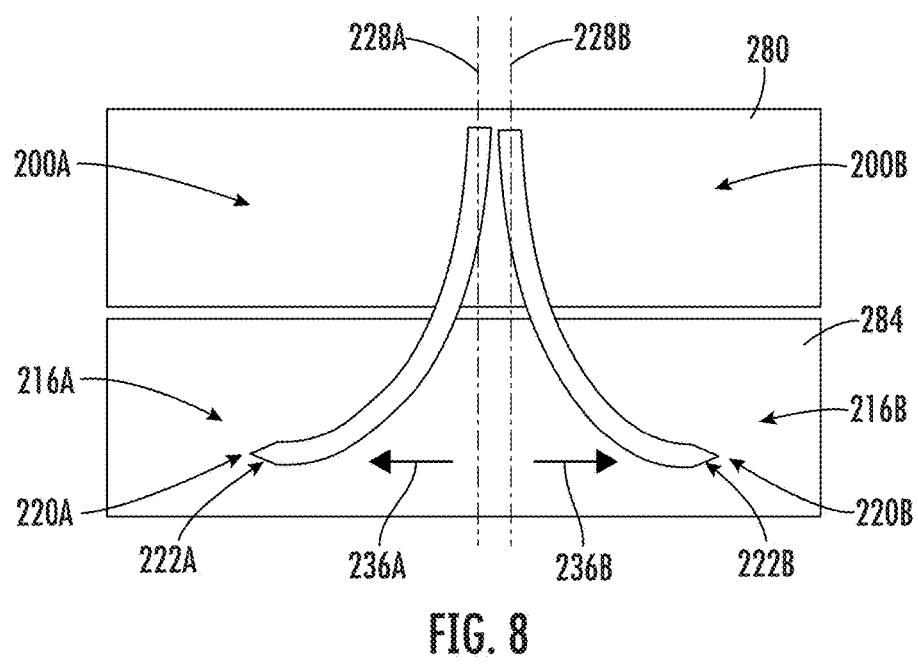
FIG. 8
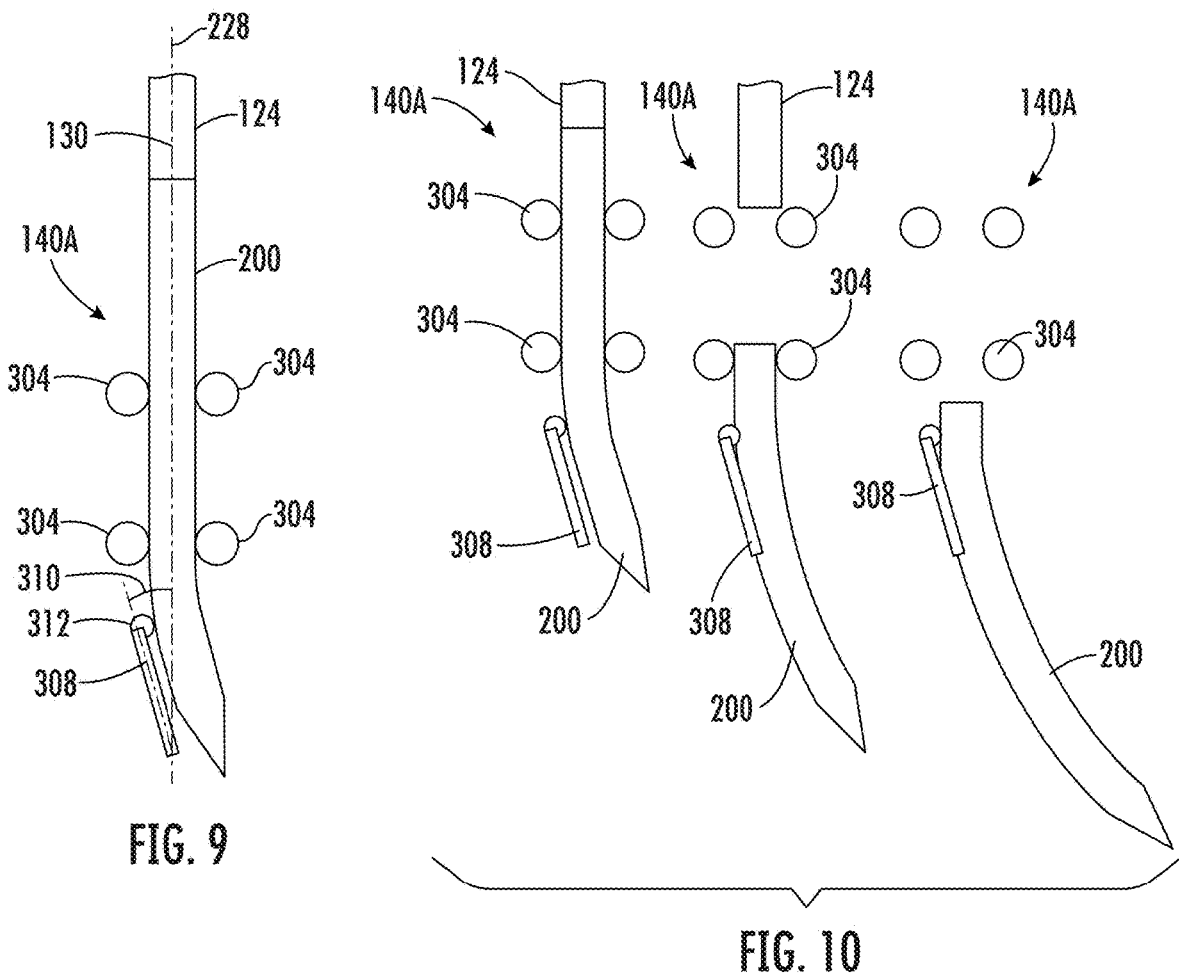
FIG. 9
FIG. 10

ANCHORING TOOL

CROSS-REFERENCE TO RELATED APPLICATIONS

This application claims priority to U.S. Provisional Application Ser. No. 63/644,137 entitled "Anchoring Tool," filed on May 8, 2024, and to U.S. Provisional Application Ser. No. 63/644,134 entitled "Anchoring Fastener," filed on May 8, 2024, the disclosures of both of which are incorporated herein by reference in their entirety.

This application is related to U.S. patent application Ser. No. 19/195,976 entitled "Anchoring Fastener" filed on same date herewith, the contents of which are incorporated herein by reference in their entirety.

FIELD

This disclosure relates generally to fastening tools, and, more particularly, fastening tools that drive fasteners into a workpiece with a striker or driving member.

BACKGROUND

In trim carpentry, to install trim and molding, a piece of trim is typically attached to drywall or to another piece of wood by driving a nail through the trim piece using a nailing tool, also referred to in the art as a nailer. The friction between the nail and the drywall retains the nail in the drywall, while the nail head affixes the trim piece to the drywall. However, the frictional force retaining the nail in the drywall is prone to failure either through failure of the drywall itself, or weakening of the frictional connection between the nail and the drywall over time.

One conventional solution to the aforementioned problem is to drive the nail entirely through the drywall and into the wood framing located behind the drywall. However, this solution requires a relatively long, and therefore large, nail to pass through the trim and the drywall with enough of the nail driven into the wood to hold the trim in place. Further, the periodic expansion and contraction of the drywall associated with temperature changes still loosens the frictional connection between the nail and the framing wood over time, resulting in eventual failure of the connection. Similar issues exist for other types of fastening as well, such as wood framing, roofing, siding, concrete and metal joining, etc. Although the description herein refers to a piece of trim being fastened to a drywall/wood, the reader should appreciate that there are similar situations in the other fastening fields.

In addition, because the conventional nail requires the nail head to maintain the position of the trim piece, insertion of the nail leaves a relatively large hole in the trim piece. This hole can be an eyesore. Alternatively, the hole may be patched for aesthetic purposes, but this requires significant additional labor to disguise the nail head.

What is needed, therefore, is a fastener connection that does not rely on friction to retain the fastener in the materials. Further, it would be beneficial if the fastener did not have an enlarged nail head.

SUMMARY

In some aspects, an anchoring tool includes a driving member defining a striking axis, a driving actuator configured to actuate the driving member along the striking axis to drive a first fastener into a workpiece, and a bending mechanism including a first deforming member configured to deform the first fastener at least partially out of the striking axis.

In some embodiments, the bending mechanism further includes an actuator configured to actuate the first deforming member to deform the first fastener.

In another embodiment, the first deforming member is configured to impinge on the first fastener when the first fastener is aligned with the striking axis so as to deform the first fastener partially out of the striking axis.

In yet another embodiment, the actuator includes a manually-actuated lever that is pivotable about a fulcrum pin.

The bending mechanism may further include an adjusting arrangement configured to adjust a lateral position of the first deforming member in a direction transverse to the striking axis so as to adjust a degree of deformation of the first deforming member.

In some embodiments, the adjusting arrangement is further configured to adjust a longitudinal position of the first deforming member along the striking axis.

In another embodiment, the driving member is configured to drive a second fastener substantially simultaneously to the first fastener in a single stroke of the driving member.

In some aspects, the bending mechanism further includes a second deforming member configured to deform a second fastener.

In other embodiments, the actuator is configured to actuate the first deforming member and the second deforming member substantially simultaneously.

In one embodiment, the first deforming member is configured to deform the first fastener in a first direction relative to the striking axis, and the second deforming member is configured to deform the second fastener in a second direction relative to the striking axis.

In some aspects, the first deforming member is arranged beyond an end of the first fastener opposite the driving member and in a path of the first fastener.

In further aspects, the first deforming member includes a deflecting mechanism configured to deflect the first fastener as the first fastener is actuated along the striking axis.

In some embodiments of the anchoring tool, the deflecting mechanism includes a plate arranged at an angle relative to the striking axis. The angle may, in some embodiments, be adjustable.

In further embodiments, the deflecting mechanism is configured to move out of a path of the first fastener after the first fastener contacts the deflecting mechanism.

In some aspects, the deflecting mechanism includes a plate and a mass, which are fixedly connected to one another and mounted about a pivot pin such that, when the first fastener is actuated by the driving member, the first fastener strikes the plate, causing the plate and the mass to pivot about the pivot pin such that the mass impinges on the first fastener.

In another embodiment an anchoring tool includes a driving member defining a striking axis, a driving actuator configured to actuate the driving member along the striking axis to drive a first fastener into a workpiece, and a bending mechanism including a lever connected to a point or edge. The bending mechanism is configured such that actuation of the lever causes the point or edge to plastically deform the first fastener at least partially out of the striking axis.

In another aspect, a method of connecting two workpieces together includes deforming a first fastener with a bending mechanism of an anchoring tool, and driving the deformed first fastener into the two workpieces with a driving member of the anchoring tool such that the first fastener bends in the two workpieces in a first direction.

The method may further include deforming a second fastener with the bending mechanism, and driving the deformed second fastener into the two workpieces with the driving member such that the second fastener bends in the two workpieces in a second direction.

In another aspect, the method includes driving a second fastener into the two workpieces with the driving member such that the second fastener is driven substantially straight into the two workpieces.

BRIEF DESCRIPTION OF THE DRAWINGS

FIG. 8 is a side cross-sectional view of a pair of fasteners after being driven into two workpieces by the anchoring tool of FIG. 1.

FIG. 9 is a top schematic view of another embodiment of a bending mechanism for the anchoring tool of FIG. 1.

FIG. 10 is a top schematic view of the bending mechanism of FIG. 9 showing the fastener at three times while being driven by the anchoring tool.

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

Figure 1:
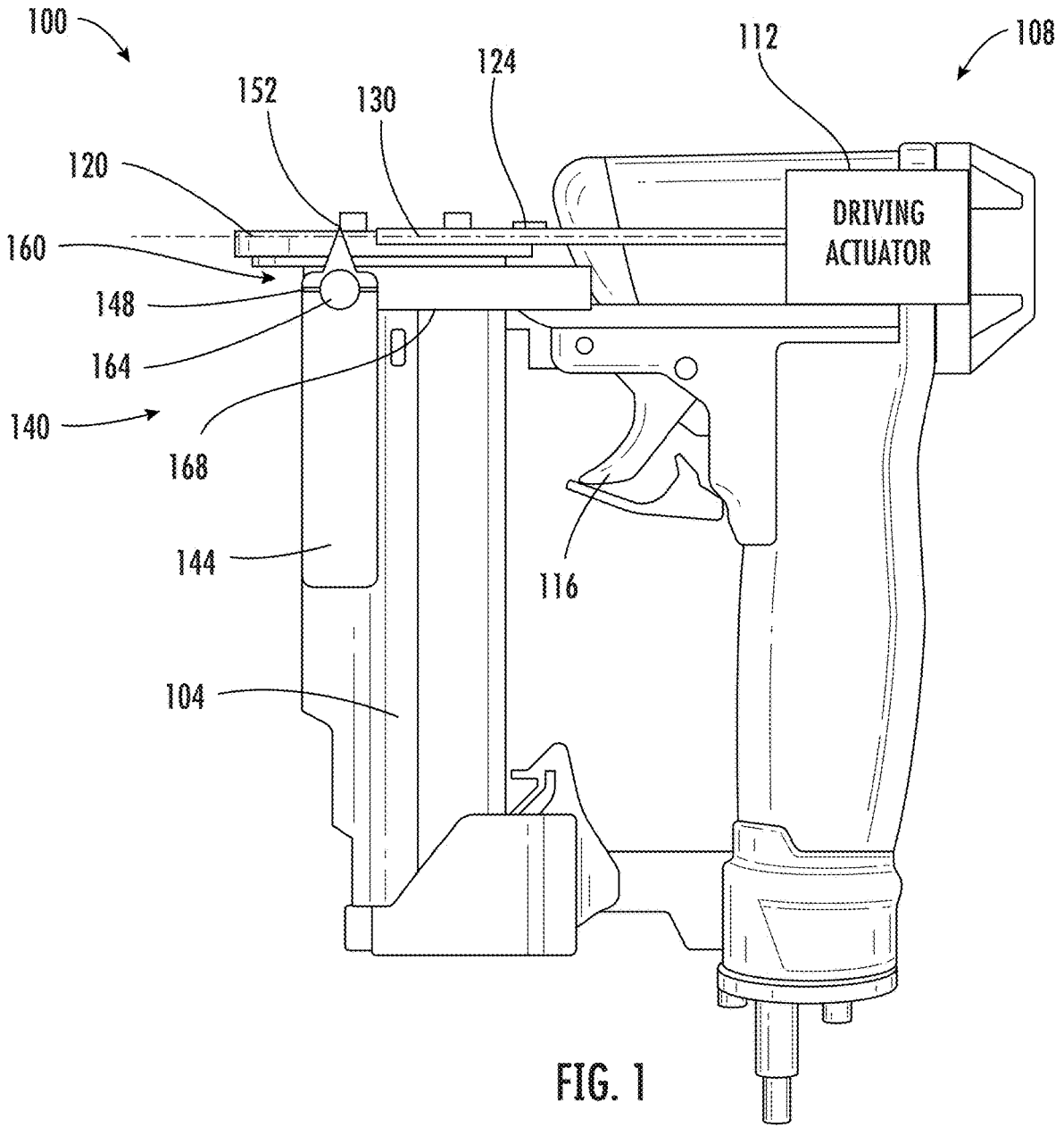
FIG. 1 is a side schematic view of an anchoring tool according to the disclosure.

FIG. 1 illustrates an anchoring tool 100 designed to drive one or more fasteners, for example nails or pins, into two or more workpieces to fasten the two or more workpieces together. As used herein, the term "workpiece" refers to a structure into which a fastener is driven to fasten the workpiece to another structure, and/or to the structure to which another structure is fastened. For example, without limitation, a workpiece may include drywall, wood, wood framing, roofing, siding, concrete, metal, etc.

The anchoring tool 100 has a magazine 104 in which a plurality of fasteners 200 (FIG. 2) are arranged, and a driving mechanism 108 configured similarly to conventional nailing tools. The driving mechanism 108 includes a driving actuator 112 configured to be activated electrically, pneumatically, by gas (i.e. butane), by powder, or the like. The driving actuator 112 is coupled to an actuating arrangement, which may include, for example, a trigger switch 116 and a work contact element (WCE) 120, that initiates actuation of the driving actuator 112 in response to the trigger switch 116 being depressed and the WCE 120 being in contact with the work surface simultaneously. The driving mechanism 108 further includes a driving member 124, also referred to as a striker, which is actuated by the driving actuator 112 to drive one or more of the fasteners 200 (FIG. 2) from the top of the magazine into a work surface.

Figure 2:
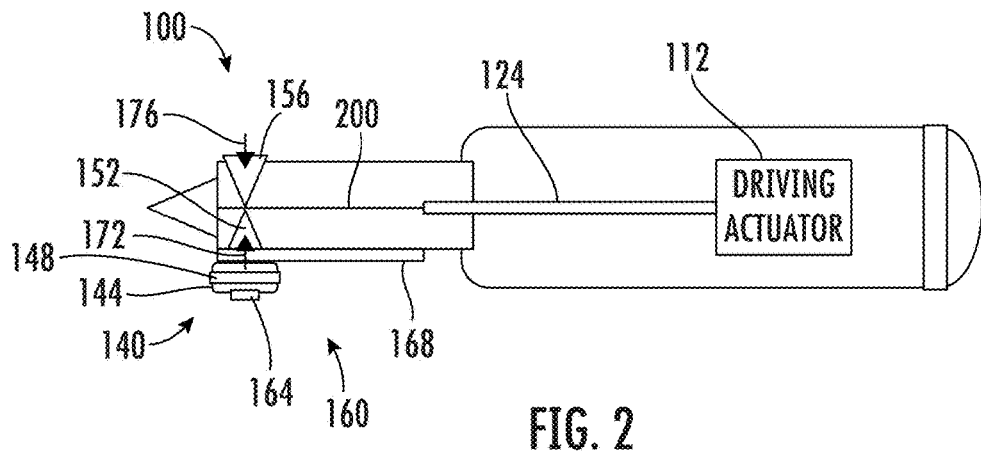
FIG. 2 is a top schematic view of the anchoring tool of FIG. 1.

The anchoring tool 100 also includes a bending mechanism 140 configured to deform a fastener, in particular plastically deform the fastener, such that, as will be described in detail below, when the one or more fasteners are driven into the workpieces, the fastener(s) produce an anchored connection between the two or more workpieces. As is best seen in FIGS. 1 and 2, the bending mechanism 140 includes an actuator configured as a lever 144 that is rotatable about a fulcrum pin 148. In the illustrated embodiment, the fulcrum pin is substantially parallel to a striking axis 130 defined by the driving member 124. The lever 144 is connected to a first deforming member 152 having a point or edge configured to deform the fastener 200. The first deforming member 152 may be, for example, a pin, a wedge, a plate, or any other suitable member that is capable of imparting deformation on the fastener 200 by exerting force on the fastener 200 over a relatively small surface area. The lever 144 provides a mechanical advantage to enable the user to impart sufficient force on the fastener 200 by manually-actuating the lever so as to enable the first deforming member 152 to deform the fastener 200 at least partially out of the striking axis 130.

Figure 3:
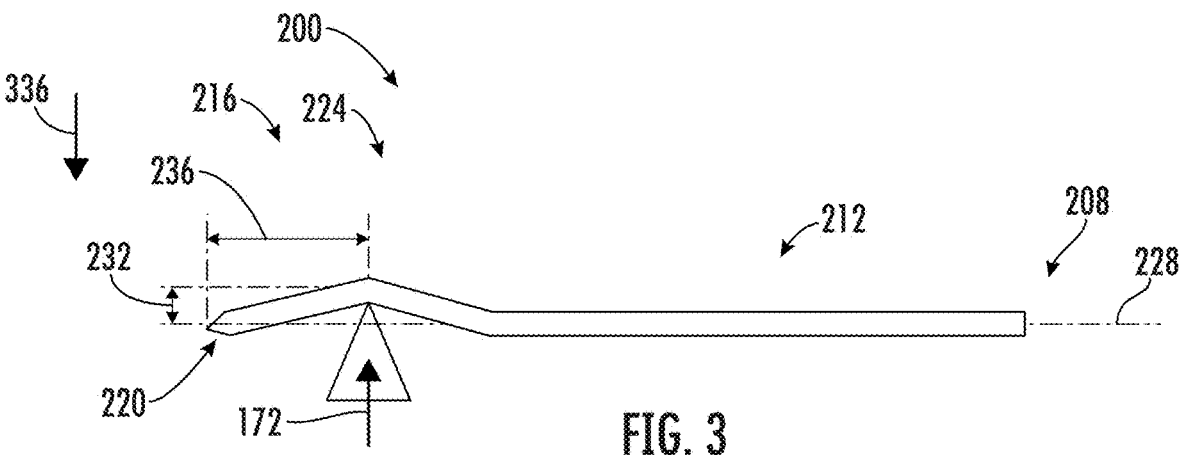
FIG. 3 is a top schematic view of a fastener being deformed by the anchoring tool of FIG. 1.

FIG. 3 illustrates the deforming of the fastener 200 by the first deforming member 152 in greater detail. The fastener 200 has a striking end 208, a middle region 212, and a tip region 216. In particular, the fastener 200 may be a pin without an enlarged head at the striking end, though the reader should appreciate that the fastener 200 may be a nail or other type of fastener as well. The tip region 216 of the fastener 200 is configured with a conventional tip 220, for example a bi-segment or four quadrant sharpening. When the lever 144 is rotated by the user about the fulcrum pin 148, the deforming member 152 presses toward the striking axis 130 and into the fastener 200, thereby deforming the fastener 200 out of its longitudinal axis 228 and forming the bent region 224.

Referring back to FIG. 2, in some embodiments, the bending mechanism 140 also includes a second deforming member 156 arranged on the side of the fasteners 200 and the striking axis 130 of the driving member 124 opposite the first deforming member 152. The second deforming member 156 functions in essentially the same manner as the first deforming member 152, and is arranged offset from the first deforming member 152 in the direction of extension of the magazine 104. In particular, the second deforming member 156 is offset by approximately the diameter of the fasteners 200 such that the first deforming member 152 is aligned with the first fastener 200 in the magazine 104, while the second deforming member 156 is aligned with the second fastener 200 in the magazine 104.

Figure 4:
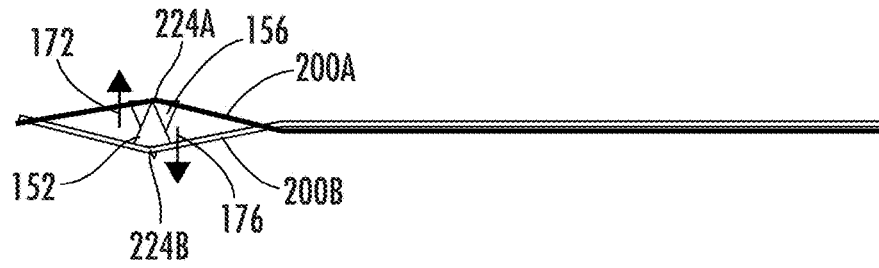
FIG. 4 is a top schematic view of two fasteners being deformed by the anchoring tool of FIG. 1.

Both the first and second deforming members 152, 156 are connected to the lever 144 such that, when the lever 144 is pivoted about the fulcrum pin 148 away from the tool, both the first and second deforming members 152, 156 move toward the fasteners 200. Specifically, as seen in FIG. 4, the first deforming member 152 impinges on the top fastener 200A in a first direction 172, thereby bending the top fastener 200A in the direction 172 to form the bent region 224A. The second deforming member 156 impinges on the second fastener 200B in a second direction 176, thereby bending the second fastener 200B in the second direction 176 and forming the bent region 224B.

Referring back to FIG. 2, the bending mechanism 140 also includes an adjusting arrangement 160 having a deflection adjustment, formed in the illustrated embodiment by a threaded dial 164. The threaded dial 164 is connected to a threaded hole that enables the bending mechanism 140 to move transverse (e.g., perpendicular) to the striking axis 130 of the driving member 124 and the longitudinal axis 228 of the fastener 200 (i.e. in a direction that is at least partially laterally, or at least partially up and down in the views of FIGS. 2 and 3) to set the amount or degree of deformation 232 (FIG. 3) of the fastener 200. The adjusting arrangement 160 is also mounted on a position adjustment rail 168 along which the deforming member 152 is moved parallel to the striking axis 130 of the driving member 124 and the longitudinal axis 228 of the fastener 200 (i.e. left and right in the views of FIGS. 1-3) to set the distance 236 from the fastener tip 220 to the deflection or bend 224.

Figure 5:
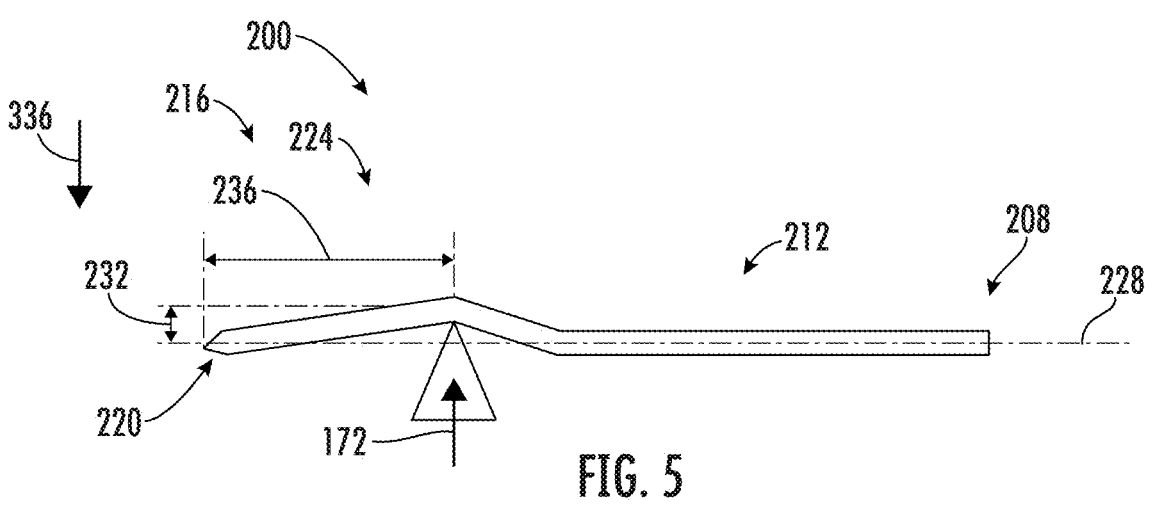
FIG. 5 is a top schematic view of a fastener being deformed by the anchoring tool of FIG. 1 in a different location than FIG. 3.
Figure 6:
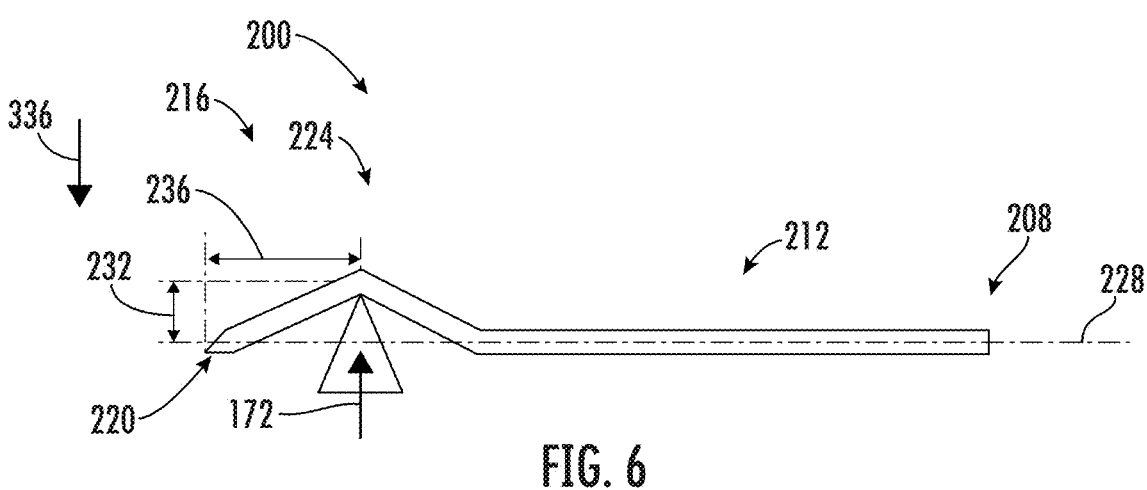
FIG. 6 is a top schematic view of a fastener being deformed by the anchoring tool of FIG. 1 in to a greater degree than FIG. 3.

As a result, as illustrated in FIG. 3, the anchoring tool 100 enables the user to selectively tune the amount of deformation 232 to the particular material of the fastener 200 and the workpieces. For instance, the anchoring tool 100 may be configured to enable the fastener to be selectively set with a deflection of between approximately 25% and approximately 500% of the diameter or width perpendicular to the longitudinal axis 228 of the fastener 200. In another embodiment, the deflection 232 may be set between approximately 50% and 100% of the diameter or width. In addition, as illustrated by FIGS. 3, 5, and 6, the user can selectively tune the position of the deflection based on the material of the fastener 200 and workpieces. More specifically, the position adjustment rail 168 may be configured to allow the deflection to be set at a distance 236 of between zero and 50% of the length of the fastener 200, measured from the tip 220. As discussed in detail below, the position and amount of deflection of the fastener 200 affects the bending characteristics of the fastener 200 in the material of the workpieces.

The anchoring tool 100 is designed such that the user can select whether to drive one or two fasteners, and whether to drive the fasteners 200 straight into the workpieces or curved into the workpieces. When straight fastening is desired, the anchoring tool is activated in a similar manner as a conventional nailing tool to fire a single fastener 200 straight into the workpieces.

However, when the anchoring feature is desired, the user selects the desired position of the deforming members 152, 156 using the adjusting arrangement 160 and rotates the lever 144 about the fulcrum pin 148. The two deforming members 152, 156 deform the fasteners 200, 200A, 200B in the manner described above with regard to FIGS. 3 and 4. When the anchoring tool 100 is actuated by the user, the driving actuator 112 actuates the driving member 124 to move rapidly along the striking axis 130, striking the top fastener(s) 200 of the magazine 104. In particular, in the embodiment of FIGS. 1 and 2, the driving member 124 is configured to actuate both of the top two fasteners 200A, B substantially simultaneously in one stroke of the driving member 124, though the reader should appreciate that the driving member 124 may be configured to actuate only one of the fasteners 200.

As seen in FIG. 8, when driven into the workpieces 280, 284, the deflection 232 of the fasteners 200A, B causes the tip 220A, B of each driven fastener 200A, B to engage the workpieces 280, 284 at an angle relative to their respective longitudinal axes 228A, B. As a result, the surfaces 222A, B of the tip 220A, B on the side of the deflection 232 engage at a greater angle of attack to the workpieces 280, 284 relative to the opposite surface of the tip 220A, B. Thus, the driving of the fasteners 200A, B causes the reaction force to produce a force 236A, B directed opposite the direction of the deflection of the bent regions 224A, B, thereby causing the fasteners 200A, B to bend away, respectively, from longitudinal axes 228A, B.

In particular, when driven into the workpieces 280, 284, the fasteners 200 may curve with a consistent bend or a progressive bend (e.g. a parabolic curve); in other words, the tip end 216A, B forms a greater angle from the longitudinal axis 228A, B than the middle region 212, which forms a greater angle from the longitudinal axis 228A, B than the striking end 208. Thus, once driven into the workpieces 280, 284, the fasteners 200A, B form a hook shape with the portion in the workpiece 284 at a greater angle from the longitudinal axis 228A, B than the portion of the fastener in the top workpiece 280.

Because the fasteners 200A, B are curved into a hook shape, the fasteners 200A, B cannot be removed from either workpiece 280, 284 without applying a force to bend the fastener in the direction opposite to the hook. As a result, the fasteners 200A, B can only be removed with application of sufficient force to mechanically deform the fasteners 200A, B. Thus, the fasteners 200A, B maintain the mechanical connection between the workpieces 280, 284 while reducing or eliminating reliance on the frictional force between the fastener and the workpieces 280, 284, and without the need for an enlarged head at the striking end 208 to clamp the top workpiece 280 against the lower workpiece 284.

Further, because the two deflecting members 152, 156 impart deflection on the fasteners in opposite directions, the two fasteners 200A, B curve in the workpieces 280, 284 in opposite directions 336A, B, respectively, away from one another. As a result, the fasteners 200 form an anchor in the two workpieces 280, 284. Accordingly, removal of the fasteners 200A, B requires deforming both fasteners 200A, B in opposite directions from one another. Consequently, the two fasteners 200A, B form a particularly strong connection between the two workpieces 280, 284.

Figure 17:
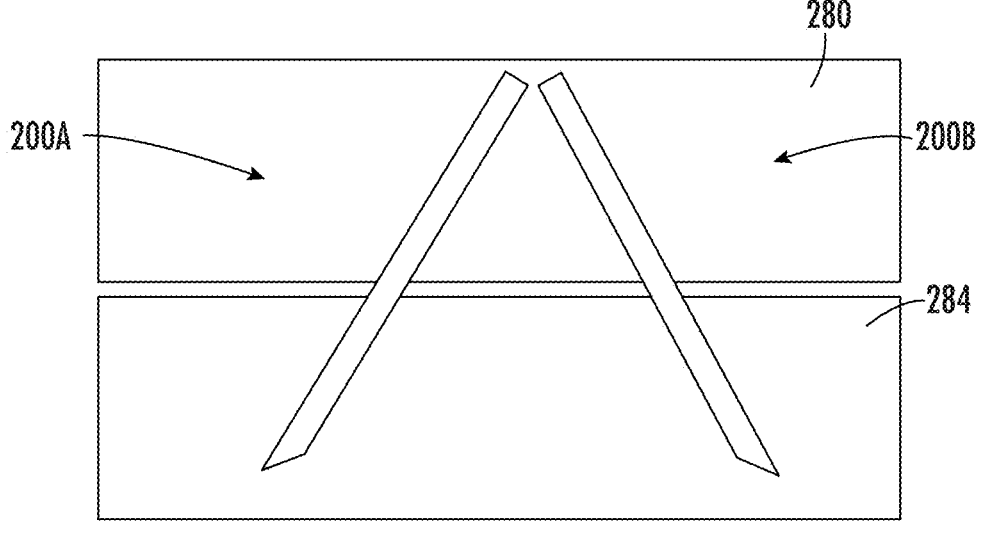
FIG. 17 is a side cross-sectional view of a pair of fasteners forming a V-shaped anchoring after being driven into two workpieces by the anchoring tool of FIG. 1.

Additionally, as noted above, the location of the deflection (e.g., distance 236) along the longitudinal axis 228 and the amount of the deflection 232 (i.e. perpendicular to the longitudinal axis 228) can be tuned depending on the particular workpiece and the fastener material. Increasing the amount of deflection of the fastener 200 causes the fastener 200 to curve more in the workpieces, while decreasing the amount of deflection causes less curvature of the fastener when driven into the workpieces. In some embodiments, the degree of deflection of the fasteners 200 may be sufficiently low that the fasteners 200 are driven straight into the workpieces at an angle from the striking axis 130. In such an embodiment, the two fasteners 200 driven in opposite directions form a V-shaped anchoring connection in the workpieces (see FIG. 17).

Figure 7:
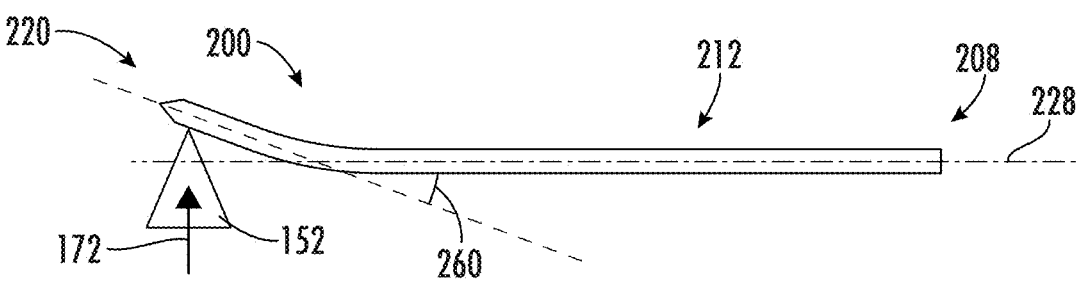
FIG. 7 is a top schematic view of a fastener being deformed by the anchoring tool of FIG. 1 near the tip of the fastener.

Moving the location of the deflection away from the tip 220 (i.e. from FIG. 3 toward FIG. 5) causes a decrease in the curvature of the fastener 200 in the workpieces. The reverse is generally true as well, though there is a distance 236 from the tip 220 beyond which the deflection no longer causes the fastener 200 to curve in the workpieces. Further, if the deflection is forward in the fastener 200 such that the tip 220 is angled out of the longitudinal axis 228, as shown in FIG. 7 by angle 260, the fastener 200 curves in the same direction as the deformation since the tip is angled in the direction of the deformation.

In some embodiments, the anchoring tool 100 may only have one deflecting member 152. In such an embodiment, although the anchoring tool 100 does not produce an anchored connection such as that shown in FIG. 7 with each actuation, the hook shape of the resulting fastener 200A provides an improved connection over a conventional straight fastener. In particular, because the fastener 200A is curved, it cannot be removed from the workpieces 280, 284 without application of sufficient force to deform the fastener 200A as the workpieces 280, 284 are pulled apart from one another.

Additionally, in some embodiments, the anchoring tool 100 may have two deflecting members 152, 156, but the driving member 124 may be configured to drive only one fastener 200 into the workpieces with each actuation. In such a configuration, the user may actuate the anchoring tool 100 twice in quick succession to drive two fasteners 200A, B into the workpieces 280, 284 and form essentially the same anchor configuration illustrated in FIG. 7.

Additionally or alternatively, an embodiment with a single deflecting member 152, or an embodiment in which at least one of the two deflecting members 152, 156 can be selectively disabled, the anchoring tool 100 may still be configured such that the driving member 124 drives two fasteners 200 substantially simultaneously. In such a configuration, one of the two fasteners 200 would be curved in the manner shown in FIG. 8, while the other fastener 200 is driven into the workpieces substantially straight, i.e. in a conventional manner without any intentional deflection.

The anchoring tool 100 may, in various embodiments, be configured such that the bending mechanism 140 actuates automatically when the anchoring tool 100 is fired. For example, in one embodiment, the retraction of the driving member 124 actuates a mechanical linkage (not shown) that causes one or both of the deforming members 152, 156 to deflect the associated fastener 200. In some embodiments, the two deforming members 152, 156 may both be arranged to deflect the top fastener, with the mechanical arrangement alternately actuating one of the two deforming members 152, 156 with each firing of the anchoring tool. In another embodiment, the driving actuator 112 is mechanically linked to one or both of the deforming members 152, 156 in such a way that the driving actuator 112 automatically actuates the associated deforming member(s) 152, 156 immediately prior (i.e. within a fraction of a second prior) to actuating the driving member 124 to drive the fastener(s) 200 into the workpieces.

In another embodiment, illustrated in FIGS. 9 and 10, the bending mechanism 140A of the anchoring tool 100 is configured to bend the fastener 200 as the fastener 200 is discharged from the tool 100. The bending mechanism 140A is arranged in the tip region of the anchoring tool 100 such that the bending mechanism 140A acts on the fastener 200 after the fastener 200 is initially struck by the driving member 124.

The bending mechanism 140A includes a plurality of guide members 304 and a deforming member configured as a deflecting member 308. The guide members 304 are configured as guide rollers in the illustrated embodiment, though in other embodiments the guide members may be configured as ribs, walls, other guiding features, or any combination of the aforementioned features. The guide members 304 and the deflecting member 308 are fixed in the anchoring tool 100 such that they do not move when the fastener 200 is fired.

The deflecting member 308 is configured as a plate, a bar, a rod, a chute, or the like, arranged partially in the path of the fastener 200. In some embodiments, the deflecting member may be arranged to intersect the striking axis 130 of the tool. As the anchoring tool 100 is fired, the fastener 200 is discharged through the guide members 304 and into contact with the deflecting member 308. As seen in FIGS. 9 and 10, since the deflecting member 308 is fixed in the anchoring tool 100, the fastener 200 is deformed as it passes the deflecting member 308, exiting the anchoring tool 100 with a bend. As a result, the fastener 200 curves in the workpieces in a similar manner as the fasteners described above with regard to FIG. 8.

The deflecting member 308 may be arranged at an angle 310 relative to the striking axis 130 and the longitudinal axis 228 of the fastener 200. The angle 310 may be, for example, between approximately 5 degrees and approximately 30 degrees. In another embodiment, the angle 310 may be between approximately 10 degrees and approximately 20 degrees.

Further, the deflecting member 308 may, in some embodiments, be pivotally adjustable about a pivot pin 312 via, for example, a knob (not shown), to enable the user to select the angle 310 and, consequently, the amount or degree of deflection of the fastener 200 based on the fastener 200 and workpiece materials. The pivotable adjustment also enables the user to move the deflecting member 308 entirely out of the path of the fastener 200 to enable the fastener 200 to be driven straight into the workpiece, or it may be adjusted to select the degree of bending of the fastener 200 in the workpiece. In some embodiments, the location and orientation of the deflecting member 308 is adjustable to enable the user to control the direction of the deflection, for example by selecting right deflection, left deflection, top deflection, bottom deflection, or anywhere between. In another embodiment, the bending mechanism may have more than one deflecting member, each of which is arranged in a different plane such that, for example, the first plate bends the fastener in one plane and the second plate bends the fastener in a different plane. The resulting faster looks like a corkscrew anchor, which, as discussed below, provides improved retention in the workpieces. Further, in some embodiments, the deflecting member 308 is movable, either about the pivot pin 312, laterally, or in another suitable manner such that the deflecting member 308 moves out of the path of the fastener 200 after the fastener 200 strikes the deflecting member 308.

As a result, the deflecting member 308 imparts a deflection on the fastener 200 in the initial contact therewith, but then allows the remainder of the fastener 200 to pass by without further interference.

Figures 11, 12, 13, 14:
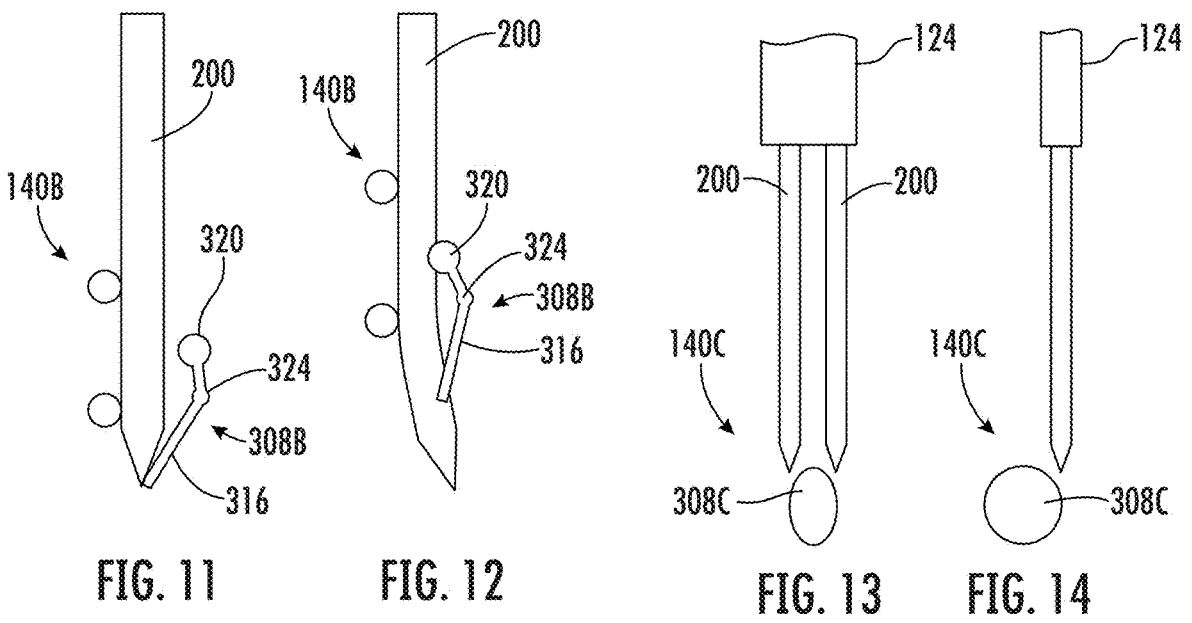
FIG. 11 is a top schematic view of another embodiment of a bending mechanism for the anchoring tool of FIG. 1.
FIG. 12 is a top schematic view of the bending mechanism of FIG. 11 as the fastener is being driven by the anchoring tool of FIG. 1.
FIG. 13 is a top schematic view of another embodiment of a bending mechanism for the anchoring tool of FIG. 1.
FIG. 14 is a top schematic view of another embodiment of a bending mechanism for the anchoring tool of FIG. 1.

FIGS. 11 and 12 illustrate another bending mechanism 140B with a deforming member configured as a deflecting mechanism 308B in which a plate 316 is fixedly connected to a mass 320, which is configured as a roller in the illustrated embodiment, both of which are jointly pivotable about a pivot pin 324. As the fastener 200 is discharged, the fastener 200 contacts the plate 316, pivoting the mass 320 into contact with the fastener 200 with sufficient force to impart a bend on the fastener 200.

FIGS. 13 and 14 depict a bending mechanism 140C having a deflecting member 308C formed as an oval prism, cylinder or sphere arranged partially in the path of the fastener 200. The bending mechanism 140C may be used in an anchoring tool 100 with a driving member 124 that fires two fasteners 200 simultaneously (see FIG. 13), either in parallel in dual magazines or in series in the same magazine, to produce the anchoring connection depicted in FIG. 8. Alternatively, the bending mechanism 140C may be configured to fire a single one of the fasteners (see FIG. 14). Further, the deflecting member 308C may be arranged between two fasteners or adjacent to a single fastener vertically (as if the views of FIGS. 13 and 14 were a side view) or horizontally (as in the top views of FIGS. 13 and 14). In addition, the deflecting member 308C may be movably mounted to the tool such that, when the deflecting member 308C is struck by the fastener 200, the deflecting member 308C moves out of the path of the fastener 200. As a result, the deflecting member 308C imparts a deflection on the fastener 200 in the initial contact therewith, but then allows the remainder of the fastener 200 to pass by without further interference.

Figures 15, 16:
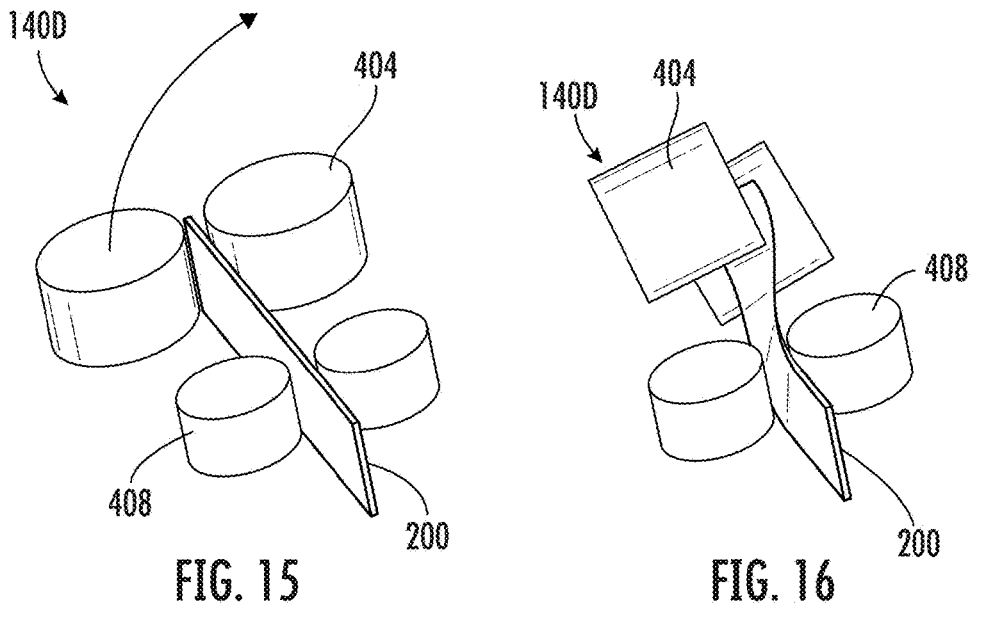
FIG. 15 is a perspective view of a bending mechanism for the anchoring tool of FIG. 1 that is configured to twist the fastener about two bending planes.
FIG. 16 is a perspective view of the bending mechanism of FIG. 15 as the fastener is being driven by the anchoring tool of FIG. 1.

FIGS. 15 and 16 illustrate another bending mechanism 140D configured to bend the fastener in two different planes so as to impart a corkscrewing motion on the fastener 200 as the fastener 200 is driven into the workpieces. In the embodiment of FIGS. 15 and 16, the fastener 200 may, in particular, be a strip-shaped fastener, i.e. it has a rectangular cross-section with one dimension substantially greater than the other side. The bending mechanism 140D includes two sets of rollers 404, 408 arranged in series. As the anchoring tool 100 is fired, the first set of rollers 404 are pivoted relative to the fastener 200 about an axis that is coincident with or generally parallel to the fastener axis. The pivoting motion of the first rollers 404 imparts a twist on the fastener 200, as the second set of rollers 408 disables the portion of the fastener 200 beyond the second set of rollers 408 from twisting. As a result, the fastener 200 is ejected into the workpieces with a corkscrewing motion. The fastener 200 therefore forms a twist into the workpieces, which can only be disengaged from the workpieces with application of sufficient shear force in multiple planes to overcome the twisting of the fastener 200.

In another embodiment, the anchoring tool 100 may have a combination of the bending mechanism 140 configured to impart a bend on the fastener 200 prior to firing, and the bending mechanisms 140A-D configured to bend the fastener during the firing sequence. Specifically, the bending mechanism 140 is configured to impart a bend on the fastener 200 in a first plane prior to actuation of the anchoring tool, while the bending mechanism 140A-D is arranged to deflect the fastener 200 in a second plane, which may be perpendicular to the first plane, as the fastener 200 is being ejected from the anchoring tool 100. The result is a corkscrewing trajectory of the fastener 200 similar to the embodiment described above with respect to FIGS. 15 and 16.

The anchoring tool 100 described herein can be used with fasteners having an enlarged head, i.e. nails, or with fasteners that do not have an enlarged head, i.e. pins. Advantageously, the anchoring connection produced by the anchoring tool 100 provides a secure connection between two or more workpieces without the need for an enlarged head on the fastener. As a result, when attaching trim or fastening ornamental or aesthetic features, the hole left from the pin fastener is small and may, in some instances, be sufficiently small that little or no subsequent treatment, such as filling or painting, is required. As a result, the anchoring tool 100 enables trim carpentry to be performed faster and with less labor than conventional tools, while providing a connection between the materials that is as strong or stronger than using a conventional nail with an enlarged head.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the foregoing disclosure.

The invention claimed is:

1. An anchoring tool comprising:

a driving member defining a striking axis;

a driving actuator configured to actuate the driving member along the striking axis to drive a first fastener into a workpiece; and a bending mechanism comprising a first deforming member configured to deform the first fastener at least partially out of the striking axis, wherein the bending mechanism further comprises an actuator configured to actuate the first deforming member to deform the first fastener, wherein the first deforming member is configured to impinge on the first fastener when the first fastener is aligned with the striking axis so as to deform the first fastener partially out of the striking axis, and wherein the actuator includes a manually-actuated lever that is pivotable about a fulcrum pin.

2. An anchoring tool comprising:

a driving member defining a striking axis;

a driving actuator configured to actuate the driving member along the striking axis to drive a first fastener into a workpiece; and a bending mechanism comprising a first deforming member configured to deform the first fastener at least partially out of the striking axis, wherein the bending mechanism further comprises an actuator configured to actuate the first deforming member to deform the first fastener, wherein the first deforming member is configured to impinge on the first fastener when the first fastener is aligned with the striking axis so as to deform the first fastener partially out of the striking axis, and wherein the bending mechanism further comprises an adjusting arrangement configured to adjust a lateral position of the first deforming member in a direction transverse to the driving member so as to adjust a degree of deformation of the first deforming member.

3. The anchoring tool of claim 2, wherein the adjusting arrangement is further configured to adjust a longitudinal position of the first deforming member along the striking axis.

4. An anchoring tool comprising:

a driving member defining a striking axis;

a driving actuator configured to actuate the driving member along the striking axis to drive a first fastener into a workpiece; and a bending mechanism comprising a first deforming member configured to deform the first fastener at least partially out of the striking axis, wherein the bending mechanism further comprises an actuator configured to actuate the first deforming member to deform the first fastener, and wherein the driving member is configured to drive a second fastener substantially simultaneously to the first fastener in a single stroke of the driving member.

5. The anchoring tool of claim 4, wherein the bending mechanism further comprises a second deforming member configured to deform the second fastener.

6. The anchoring tool of claim 5, wherein the actuator is configured to actuate the first deforming member and the second deforming member substantially simultaneously.

7. The anchoring tool of claim 5, wherein the first deforming member is configured to deform the first fastener in a first direction relative to the striking axis, and the second deforming member is configured to deform the second fastener in a second direction relative to the striking axis.

8. An anchoring tool comprising:

a driving member defining a striking axis;

a driving actuator configured to actuate the driving member along the striking axis to drive a first fastener into a workpiece; and a bending mechanism comprising a first deforming member configured to deform the first fastener at least partially out of the striking axis, wherein the first deforming member is arranged beyond an end of the first fastener opposite the driving member and in a path of the first fastener.

9. The anchoring tool of claim 8, wherein the first deforming member comprises a deflecting mechanism configured to deflect the first fastener as the first fastener is actuated along the striking axis.

10. The anchoring tool of claim 9, wherein the deflecting mechanism includes a plate arranged at an angle relative to the striking axis.

11. The anchoring tool of claim 10, wherein the angle is adjustable.

12. The anchoring tool of claim 9, wherein the deflecting mechanism is configured to move out of a path of the first fastener after the first fastener contacts the deflecting mechanism.

13. The anchoring tool of claim 9, wherein the deflecting mechanism includes a plate and a mass, which are fixedly connected to one another and mounted about a pivot pin such that, when the first fastener is actuated by the driving member, the first fastener strikes the plate, causing the plate and the mass to pivot about the pivot pin such that the mass impinges on the first fastener.

* * * * *